April 27, 1971   J. J. ABRAMSON ET AL   3,576,675
CONTINUOUS MIXING OF BATTERY PASTE
Filed Dec. 11, 1968
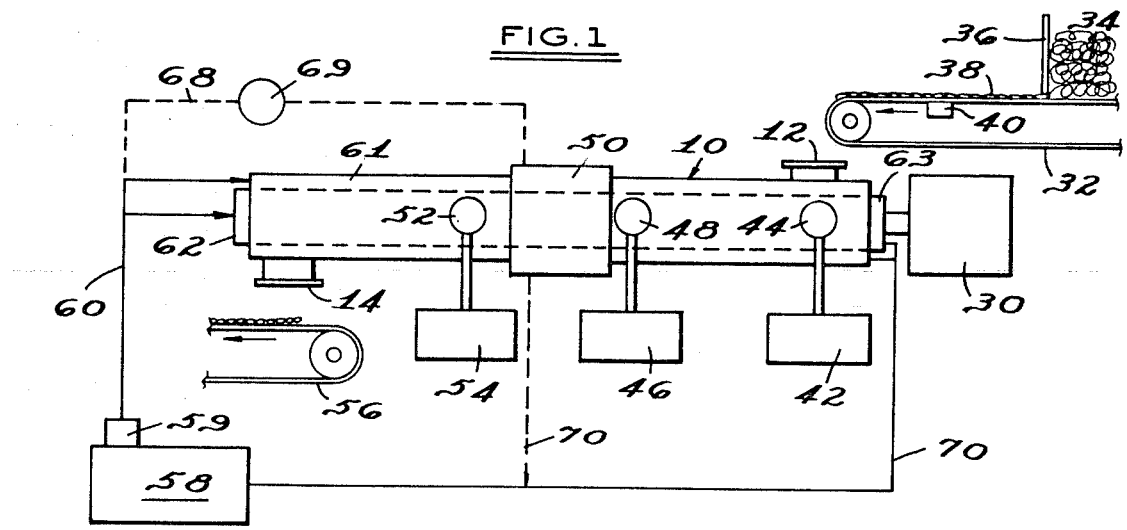
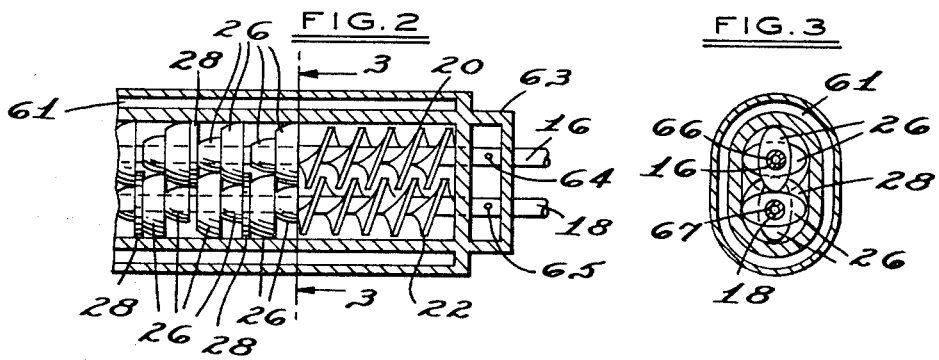
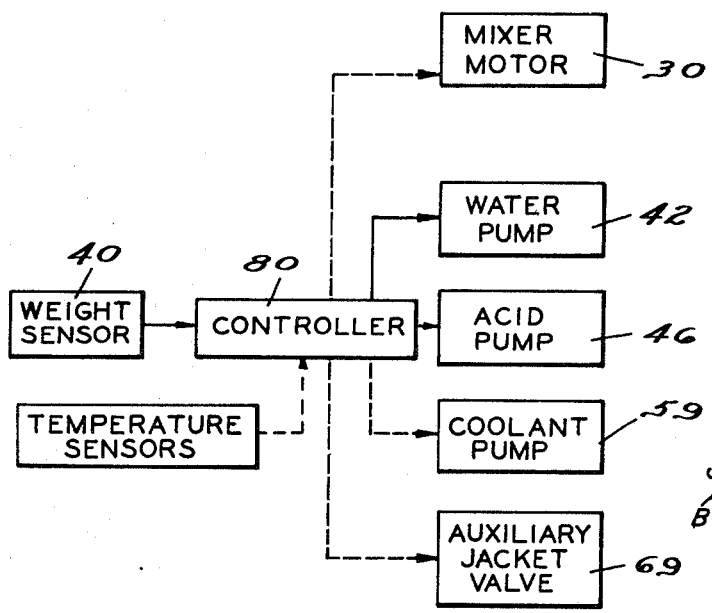
INVENTORS
JAY J. ABRAMSON
ALLAN B. ROSSER
BY
John R. Faulkner
Glenn S. Arendeen
ATTORNEYS

United States Patent Office 3,576,675
Patented Apr. 27, 1971

3,576,675
CONTINUOUS MIXING OF BATTERY PASTE
Jay J. Abramson, Southfield, and Allan B. Rosser, Ann Arbor, Mich., assignors to Ford Motor Company, Dearborn, Mich.
Filed Dec. 11, 1968, Ser. No. 782,947
Int. Cl. H01m 39/00
U.S. Cl. 136—27     9 Claims

ABSTRACT OF THE DISCLOSURE

Particulate lead oxide is dropped into one end of an elongated housing that contains rotating mixing paddles. Water is injected into the housing at approximately the same location. The paddles mix the water with the lead oxide while moving the mixture toward the exit end of the housing. Sulfuric acid is injected into the housing at a downstream location where the water and lead oxide have been mixed thoroughly. Other ingredients can be injected into the mixture at those locations conducive to continuous production of battery paste having uniform physical and chemical properties.

SUMMARY OF THE INVENTION

Virtually all lead acid storage battery plates are manufactured by applying a paste of the active plate material to a supporting grid, curing the paste, and subsequently charging the battery to convert the paste to the compositions producing the desired electrical potential. Such pastes are made from a mixture of lead, lead oxide, water, sulfuric acid and minor ingredients. Most commercial pastes still are produced by a batch process in which the ingredients are mixed in a large container for an empirically determined amount of time.

Physical and chemical properties of the paste depend to a large extent on both the rate and sequence of the chemical reactions occurring during paste mixing and significant variations in the properties result within each batch as well as between batches. Variations in physical properties such as paste consistency and density interfere with applying the paste to the grids and pasted grids having differing sizes, weights, and porosities result. Variations in chemical properties such as the percentages of lead, lead oxide, lead sulfate and basic lead sulfates directly affect the ability of the plates to convert to the desired crystalline structures in the charging process. Any of these variations generally result in less than optimum performance during battery use.

Pastes having uniform chemical and physical properties are produced by the continuous mixing process provided by this invention. The process comprises dropping relatively dry particulate lead oxide into an elongated housing containing rotating mixing paddles. As the paddles move the materials through the housing toward its exit end, the other ingredients are added sequentially and mixed thoroughly. Each new ingredient is added at a carefully selected position determined by the desired degree of mixing of the previously added ingredients. Coolant is circulated through the shafts carrying the mixing paddles and a jacket surrounding the housing to maintain the ingredients at the proper tempertaure throughout the length of the mixer.

The lead oxide generally contains various amounts of particulate lead and small amounts of cellulose flock. Many modern batteries use about 30 weight percent lead and about ½ weight percent cellulose flock. Pastes intended for use in making negative battery plates generally contain small amounts of an expander also. The term "lead oxide" as used in this application is intended to include these and any other additives to the lead oxide.

Flexibility in the rate of paste production is provided by a control system that links the amounts of water, acid and other additives to the rate at which lead oxide is fed to the housing. The rotating speed of the mixing paddles and the temperature and circulation rate of the coolant also can be controlled according to the rate at which lead oxide is fed to the housing if desired. Alternatively, coolant control can be carried out in response to sensors measuring the temperature of the paste inside or at the exit of the housing.

The primary signal for the control system is taken from a weight sensor associated with a conveyor belt bringing the particulate lead oxide to the mixer housing. This signal is applied to electronic or pneumatic proportioning circuitry that conrols the flow rate of the water pump, acid pump and other ingredients adding mechanisms along with the speed of the paddle driving motor and the flow rate and temperature of the coolant if desired. Auxiliary cooling jackets can be added at locations along the length of the mixer where highly exothermic reactions might raise the temperature of the mixture to the point where undesirable side reactions take place. Pastes having substantially the same chemical composition, consistency, density and temperatures thus are produced at widely varying production rates.

BRIEF DESCRIPTION OF THE DRAWINGS

FIG. 1 is a schematic presentation of the continuous process of this invention showing the relative locations at which the various ingredients are added. The figure also shows the cooling system with its auxiliary cooling jacket for maintaining careful control over the temperature of the composition in the mixer. FIG. 2 is a side view and FIG. 3 is an end view of the mixing paddles located within the housing. FIG. 3 is taken along line 3—3 in FIG. 2. FIG. 4 is a schematic of a control system capable of maintaining good uniformity at different paste production rates. Alternative features of the control system are indicated in the figure by dashed lines.

DETAILED DESCRIPTION

Referring to FIGS. 1 and 2, a substantially cylindrical elongated housing 10 is mounted with its longitudinal axis substantially horizontal. Housing 10 has an inlet 12 on the top surface near one end and an exit 14 on the bottom surface near the other end. Inside the housing are two rotating shafts 16 and 18. Both shafts have spiral forms 20 and 22 at the inlet end and a plurality of mixing paddles 26 separated by flow control discs 28 downsteam of the spiral forms.

Paddles 26 are oval or teardrop shaped and are assembled onto shafts 16 and 18 with the major diameter of each successive paddle at a right or an offset angle to the previous paddle. Shaft 16 is synchronized with shaft 18 by appropriate gearing (not shown) so the paddles on one shaft cooperate with the corresponding paddles on the other shaft during rotation (see FIG. 3). Ample clearance exists between the peripheries of the corresponding paddles. The peripheral surfaces of the paddles slope inward toward the downstream edges so rotation of the shafts urges materials downstream.

Discs 28 are mounted at alternate locations along the shafts to direct the materials radially across housing 10 as the materials move downstream. Paddles 26 and discs 28 make up about three quarters of the entire length of the shafts. An electric motor 30 is coupled by gearing (not shown) to shafts 16 and 18.

One end of a conveyor belt 32 is positioned above inlet 12. A quantity of particulate lead oxide 34 is supplied to the upper end of conveyor belt 32 and a gate 36 extends laterally across the belt at an intermediate location. Gate 36 is movable vertically and its location relative to the top surface of belt 32 determines the thickness of a layer 38 of the lead oxide carried by the belt. A weight sensing device 40 is associated with belt 32 a short distance downstream from gate 36.

A water pump 42 couples a water supply (not shown) through a fitting 44 to housing 10 at the approximate location of inlet 12. Inlet 12 and water fitting 44 both communicate with the portion of housing 10 containing spiral forms 20. An acid pump 46 couples an acid supply (not shown) with a fitting 48 that communicates with the interior of housing 10 a short distance downstream from water fitting 44. Just downstream of inlet fitting 48, an auxiliary cooling jacket 50 is located on housing 10. Jacket 50 is preferably built into housing 10 so the coolant circulating through the auxiliary jacket can do an efficient job of cooling the ingredients inside the housing.

About one-third of the distance from the exit end of housing 10, an additional fitting 52 communicates with the interior of the housing. Fitting 52 is coupled to a pump 54 capable of supplying any additional ingredients to the housing interior. Typical of such ingredients is an antioxidizing oil frequently used in pastes intended for negative plates. A conveyor belt 56 is positioned below exit 14 to catch the paste exiting from housing 10. Belt 56 delivers the paste to the plate pasting machine (not shown).

A heat exchanger 58 having a pump 59 associated therewith is connected by piping 60 to the main cooling jacket 61 and a chamber 62 located at the end of housing 10. A similar chamber 63 located at the opposite end of the housing 63 is shown in cross section in FIG. 2. Holes 64 and 65 in shafts 16 and 18 connect chamber 63 with passages 66 and 67 extend axially through the shafts, and similar holes connect passages 66 and 67 with chamber 62. An auxiliary pipe 68 containing a control valve 69 connects the outlet of pump 59 with auxiliary jacket 50. Piping 70 connects main cooling jacket 61, chamber 63, and auxiliary jacket 50 with the inlet to heat exchanger 58.

A control system for the various motors and feeding systems is shown in FIG. 4. Signals from weight sensor 40 are fed into a proportioning controller 80 that accordingly determines the flow rates produced by water pump 42, acid pump 46 and pump 54. The controller also determines the flow rate produced by coolant pump 59, the pressure drop across auxiliary jacket valve 69 and the speed of belt 56 if desired.

Continuous mixing is carried out in the following manner. Particulate lead oxide 34 is delivered to belt 32 on the right side of gate 36. Gate 36 meters a definite amount of the lead oxide onto the left portion of belt 32 and as the lead oxide passes over weight sensor 40, a signal proportional to the quantity of lead oxide is applied to controller 80. The lead oxide then drops off the left end of belt 32 into inlet 12.

Motor 30 rotates shafts 16 and 18 so spiral forms 20 and 22 urge the lead oxide to the left in FIGS. 1 and 2. Water pump 42 delivers water to spiral forms 20 and 22 at a predetermined rate and the water mixes with the lead oxide as the materials move along spiral forms 20 and 22 and enter the area of mixing paddles 26. At a predetermined location downstream from water fitting 44, dilute sulfuric acid is pumped into the interior of housing 10 by acid pump 46. The arrangement of paddles 26 and discs 28 mixes the sulfuric acid with the mixture of lead oxide and water. Any heat generated by the mixing is absorbed in the main water jacket 61 and the auxiliary water jacket 50. Thoroughly mixed materials having a constant temperature, density, and penetration ultimately reach exit 14 and drop onto belt 56.

When paste intended for use in negative battery plates is being manufactured, small amounts of oil are added to the mixture within housing 10 through fitting 52. In a typical installation for manufacturing negative battery paste, 40 lbs. of lead oxide are fed to the mixer per minute. Motor 30 is operated at 100 r.p.m. and 3.5 lbs. of sulfuric acid having a specific gravity of 1.385, 4 lbs. of water, and 35 grams of oil are added each minute. Completely mixed paste having a density of about 65 grams per cubic inch is produced at a rate of 48 lbs. per minute.

Controller 80 must be calibrated empirically to provide the proper flow rates for the various paste production rates. A variable speed motor can be used to drive the mixer shafts and motor speed can be controlled as a function of signals generated by the controller. An ethylene glycol and water solution conveniently serves as the coolant. In some installations, adequate mixing is achieved without the flow control discs 28.

Water fitting 44 can be located further downstream where the fitting communicates with the portion of the housing surrounding the paddles. A dilute solution of sulfuric acid is preferable, and all water and acid can be premixed before being supplied to the housing; this type of system eases the temperature control problems.

Thus this invention provides a continuous process for producing paste for lead acid battery plates. The process maintains careful control over the ingredients and the temperatures generated during mixing to produce paste having uniform chemical and physical properties. Pastes having uniform properties are produced at varying rates through the use of the control system.

We claim:
1. A continuous process for producing paste for lead acid battery plates comprising
 rotating multiple mixing means in an elongated housing, said mixing means urging materials in said housing toward the exit end of the housing,
 feeding a material consisting essentially of particulate lead oxide into said housing at the inlet end, said feeding step comprising adding lead oxide to a moving conveyor belt, spacing a movable gate a predetermined distance above the belt where the gate passes a layer of lead oxide having a relatively uniform thickness and width, continuously sensing the weight of lead oxide on a portion of the belt downstream of said gate, and dropping the lead oxide off the end of the belt through an opening in the upper portion of the inlet end of the housing,
 applying a signal representing the weight of lead oxide to a controller,
 injecting water into said housing near the inlet end, said controller controlling the amount of said water being injected as a function of the weight of lead oxide supplied to the housing,
 thoroughly mixing said water with said particulate lead oxide in a portion of the length of said housing,
 injecting sulfuric acid into said housing at a location downstream of said water injection where said water has been mixed thoroughly with said lead oxide, said controller controlling the amount of sulfuric acid being injected as a function of the weight of lead oxide supplied to the housing,
 thoroughly mixing and reacting said sulfuric acid with the particulate lead oxide and water mixture in another portion of the length of said housing, and
 removing mixed paste from the exit end, said mixed paste having substantially the same chemical and physical properties throughout a wide range of production rates.

2. The process of claim 1 comprising flowing coolant through a jacket surrounding said housing and through passages in said mixing means counter-currently to the flow of materials in said housing.

3. The process of claim 2 comprising adding supplemental ingredients to said housing at a location downstream of said sulfuric acid injection.

4. The process of claim 3 comprising flowing additional coolant through a supplemental jacket just downstream of the location at which sulfuric acid is injected into the housing.

5. The process of claim 4 comprising controlling the rotational speed of the mixing means as a function of the amount of lead oxide being supplied to the housing.

6. The process of claim 5 comprising sensing the temperature of the paste leaving the housing and controlling the flow of coolant to the housing as a function of said temperature.

7. The process of claim 1 comprising flowing additional coolant through a supplemental jacket just downstream of the location at which sulfuric acid is injected into the housing.

8. The process of claim 1 comprising controlling the rotational speed of the mixing means as a function of the amount of lead oxide being supplied to the housing.

9. The process of claim 1 comprising sensing the temperature of the paste leaving the housing and controlling the flow of coolant to the housing as a function of said temperature.

References Cited
UNITED STATES PATENTS

| | | | |
|---|---|---|---|
| 2,555,301 | 6/1951 | Chubb | 136—27 |
| 3,049,750 | 8/1962 | Austin | 259—6 |
| 3,349,725 | 10/1967 | Bini | 259—6 |
| 3,387,826 | 6/1968 | Loomans | 259—6 |
| 3,430,924 | 3/1969 | Masuo Hosokawa et al. | 259—6 |
| 2,980,291 | 4/1961 | Schuerger | 75—5 |
| 3,153,587 | 10/1964 | Schuerger | 75—5 |

WINSTON A. DOUGLAS, Primary Examiner

C. F. LEFEVOUR, Assistant Examiner

U.S. Cl. X.R.

259—6